(12) United States Patent
Jackson

(10) Patent No.: US 6,662,361 B1
(45) Date of Patent: Dec. 9, 2003

(54) METHOD, SYSTEM, PROGRAM, AND DATA STRUCTURES FOR TRANSFORMING AN INSTRUCTION IN A FIRST BIT ARCHITECTURE TO AN INSTRUCTION IN A SECOND BIT ARCHITECTURE

(75) Inventor: Andrea Ontko Jackson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,203

(22) Filed: Jan. 14, 2000

(51) Int. Cl.$^7$ ................................................. G06F 9/45
(52) U.S. Cl. ........................ 717/136; 717/139; 712/209; 712/226
(58) Field of Search ................................. 717/134–136, 717/137–140; 712/209, 226, 227, 244–248

(56) References Cited

U.S. PATENT DOCUMENTS

| | | | |
|---|---|---|---|
| 5,420,992 A | | 5/1995 | Killian et al. |
| 5,568,630 A | | 10/1996 | Killian et al. |
| 5,577,231 A | * | 11/1996 | Scalzi et al. .................. 703/26 |
| 5,664,136 A | | 9/1997 | Witt et al. |
| 5,781,750 A | * | 7/1998 | Blomgren et al. .......... 712/209 |
| 5,819,067 A | | 10/1998 | Lynch |
| 5,826,089 A | | 10/1998 | Ireton |
| 5,842,017 A | * | 11/1998 | Hookway et al. ........... 717/158 |
| 5,875,318 A | | 2/1999 | Langford |
| 5,875,336 A | | 2/1999 | Dickol et al. |
| 6,009,261 A | * | 12/1999 | Scalzi et al. .................. 703/26 |
| 6,018,799 A | * | 1/2000 | Wallace et al. ............. 712/300 |
| 6,199,202 B1 | * | 3/2001 | Coutant et al. ............. 717/138 |

OTHER PUBLICATIONS

"Turning the Power Up to 64 Bits with Solaris™ 7", Sun Microsystems, Inc. 1994, pp. 1–8, [retrieved on Jan. 2, 2000]. Retrieved from the internet: <URL: http://www.sun.com/software/solaris/guides/64bit–powerup.html>.

C.G. Willard, Ph.D., "64–Bit Computing Comes of Age", International Data Corporation 1998, pp. 1–16.

\* cited by examiner

Primary Examiner—Tuan Q. Dam
Assistant Examiner—Mary Steelman
(74) Attorney, Agent, or Firm—David W. Victor; Konrad Raynes Victor & Mann LLP

(57) ABSTRACT

Disclosed is a method, system, program, and data structures for transforming an instruction in a first bit architecture, e.g., 32 bit, to an instruction in a second bit architecture, e.g., 64 bit. Code is transformed from an instruction in the first bit architecture having an operation code and at least one operand. A transform table is accessed including information for transforming the instruction in the first bit architecture to the second bit architecture. The instruction in the first bit architecture is transformed to a corresponding instruction in the second bit architecture if the transform table includes information indicating to modify the instruction in the first bit architecture. The transformation is based on transformation operations that modify the instruction in the first bit architecture to generate the instruction in the second bit architecture.

36 Claims, 4 Drawing Sheets

150

| OPERAND 1 | OPERAND 2 | REPLACE INSTRUCTION | SET REG1 FLAG |
|---|---|---|---|
| N/A | 32 | ST OP1, OP2 | N/A |
| 64 | 64 | STG OP1, OP2 | N/A |
| 32/SIGNED | 64 | LGFR OP1, OP1<br>STG OP1, OP2 | 64 |
| 32/UNSIGNED | 64 | LLGFR OP1, OP1<br>STG OP1, OP2 | 64 |

FIG. 4

METHOD, SYSTEM, PROGRAM, AND DATA STRUCTURES FOR TRANSFORMING AN INSTRUCTION IN A FIRST BIT ARCHITECTURE TO AN INSTRUCTION IN A SECOND BIT ARCHITECTURE

BACKGROUND OF THE INVENTION

1. Field of the Invention

Preferred embodiments provide a method, system, program, and data structure for transforming an instruction in a first bit architecture to an instruction in a second bit architecture.

2. Description of the Related Art

Many application programs are written for computers using a 32 bit architecture. However, large scale processing systems are beginning to employ a 64 bit architecture. A 64 bit computing architecture substantially increases the address space, register size, and data structure size that may be used. Further, 64-bit computing provides much faster processing and data transfer than 32 bit. For example, one 64-bit instruction can handle operations that would otherwise take several 32 bit instructions, plus "clean-up" code. A 64-bit system can address more memory directly without using complex indexing or register-addressing schemes. Current 64 bit computers include Sun Microsystems Corporation's Solaris 7 Operating Environment, Compaq Computer Corporation's AlphaStation 200, as well as other Compaq products using the Alpha 64 bit processor developed by Digital Equipment Corporation, and Intel Corporation's Merced and Itanium processors, based on the IA-64 architecture, which is the 64 bit architecture promoted by Intel.**

**Solaris is a trademark of Sun Microsystems Corporation; Itanium is a trademark and Merced and IA-64 are code names of Intel Corporation.

Notwithstanding the benefits of 64 bit computing, many programs are still written using 32 bit instructions. Thus, compiler developers may have to continue supporting 32 bit programs even as the industry moves toward 64 bit architecture computers. To maintain compatibility with existing architectures and compilers (i.e., hide the intricacies from the programmer), compiler developers must incorporate effective intelligence as to when and where to use 64-bit capabilities. Thus, there is a need in the art to develop compilers that are capable of handling both 32 and 64 bit computing to support the transition between 32-bit and 64-bit architectures.

SUMMARY OF THE PREFERRED EMBODIMENTS

To overcome the limitations in the prior art described above, preferred embodiments disclose a method, system, program, and data structures for transforming an instruction in a first bit architecture to an instruction in a second bit architecture. Code is transformed from an instruction in the first bit architecture having an operation code and at least one operand. A transform table is accessed including information for transforming the instruction in the first bit architecture to the second bit architecture. The instruction in the first bit architecture is transformed to a corresponding instruction in the second bit architecture if the transform table includes information indicating to modify the instruction in the first bit architecture. The transformation is based on transformation operations that modify the instruction in the first bit architecture to generate the instruction in the second bit architecture.

The first bit architecture may be a 32 bit architecture and the second bit architecture may be a 64 bit architecture.

In further embodiments, the transform table includes one entry for each operation code. The entry for each operation code is capable of including a pointer to an operand table if a transformation is to be performed. No transformation is performed if the entry for the operation code does not include a pointer to one operand table.

The operand table includes an entry for each possible combination of operand bit architecture types. Each entry in the operand table indicates at least one transformation operation. In such case, transforming the instruction involves determining one entry in the operand table having operand bit architecture types that match the bit architecture types of each operand in the instruction in the first bit architecture. At least one transformation operation is then executed to transform the instruction in the first bit architecture to the second bit architecture.

Preferred embodiments provide a technique for transforming instructions from one architecture to another, e.g., 32 bit to 64 bit. With the preferred embodiment technique, the compiler that transforms the code, e.g., intermediate code, to the 32 bit instructions does not have to be modified. Instead, the resulting 32 bit instruction is processed using various tables that provide transformation operations for each operation code type. Preferred embodiments are especially useful for machines that want to support both the 32 bit and 64 bit architectures to allow source programs to be written using 32 bit instructions and data and still operate on the machine.

BRIEF DESCRIPTION OF THE DRAWINGS

Referring now to the drawings in which like reference numbers represents corresponding parts throughout:

FIG. 4 provides an example of the entries used to transform a STORE command from 32 to 64 bit format in accordance with preferred embodiments of the present invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
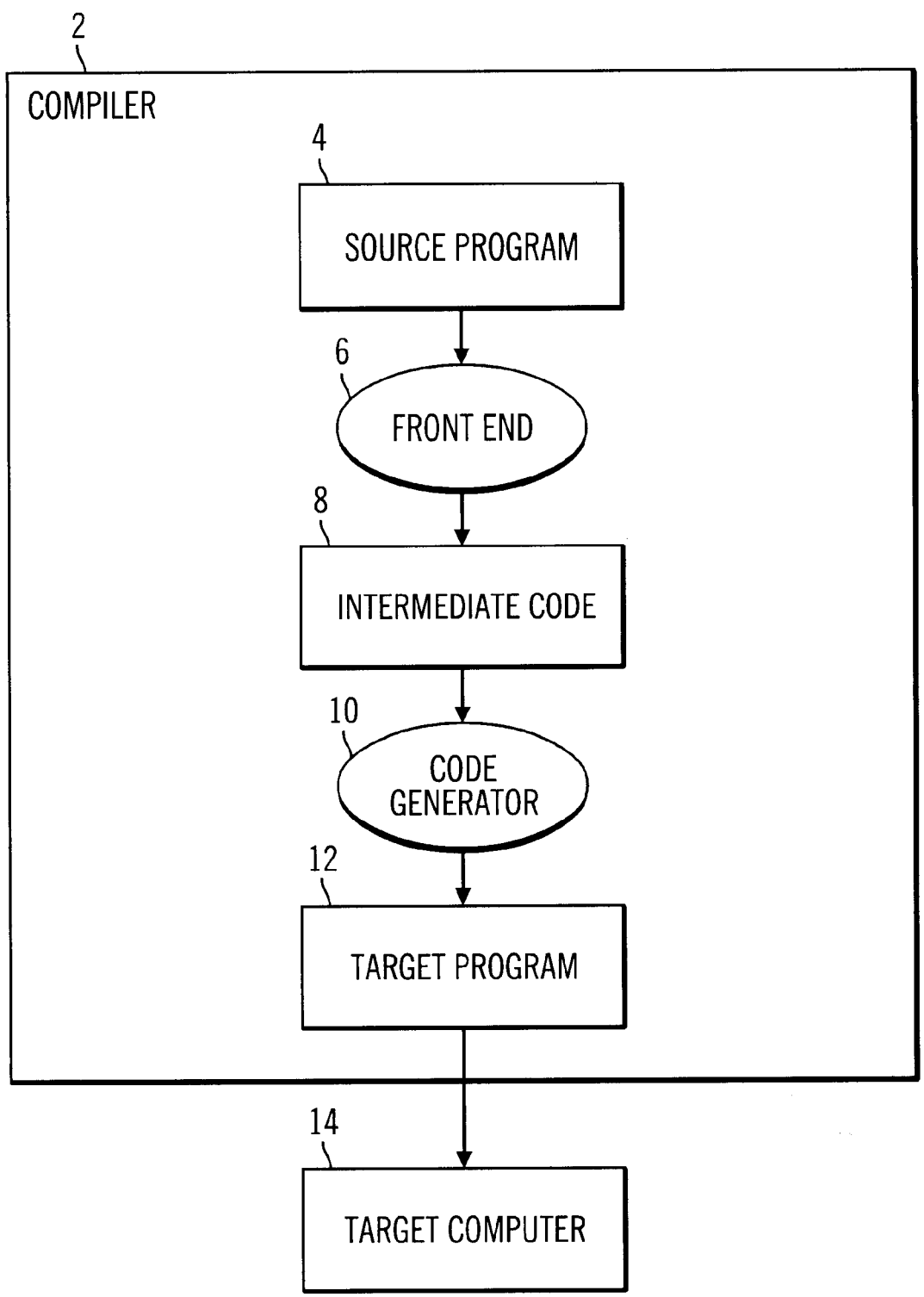
FIG. 1 illustrates the components of a compiler.

FIG. 1 illustrates the general components of a compiler 2. The compiler 2 receives as input a source program 4, written in a high level source language. A front end process 6 converts the source program 4 to intermediate code 8, by scanning, parsing, and translating the source program 4 into a detailed intermediate representation 8 such that the values of names appearing in the intermediate code 8 can be represented by quantities that the target machine can directly manipulate, e.g., bits, integers, reals, pointers, etc. A code generator 10 receives the intermediate code 8 as input and produces as output a target program 12, which may comprise absolute machine language, relocatable machine language or assembly language.

The target program 12 is intended to execute on a target computer 14. In preferred embodiments, the target computer 14 is capable of processing both 32 bit and 64 bit instructions. For instance, the target computer may implement the Intel IA-64 Architecture, which supports both 32 and 64 bit instruction sets. The Intel IA-64 processors can run 32 bit applications on a 64 bit operating system that supports execution of 32 bit applications. The Intel IA-64 architecture also is capable of executing mixed 32 and 64 bit code. Further details of the Intel IA-64 architecture are described in the Intel publication "IA-64 Application Developer's Architecture Guide," Order No. 245188-011 (Copyright Intel Corporation, May, 1999), which publication is incorporated herein by reference in its entirety.

Figure 2:
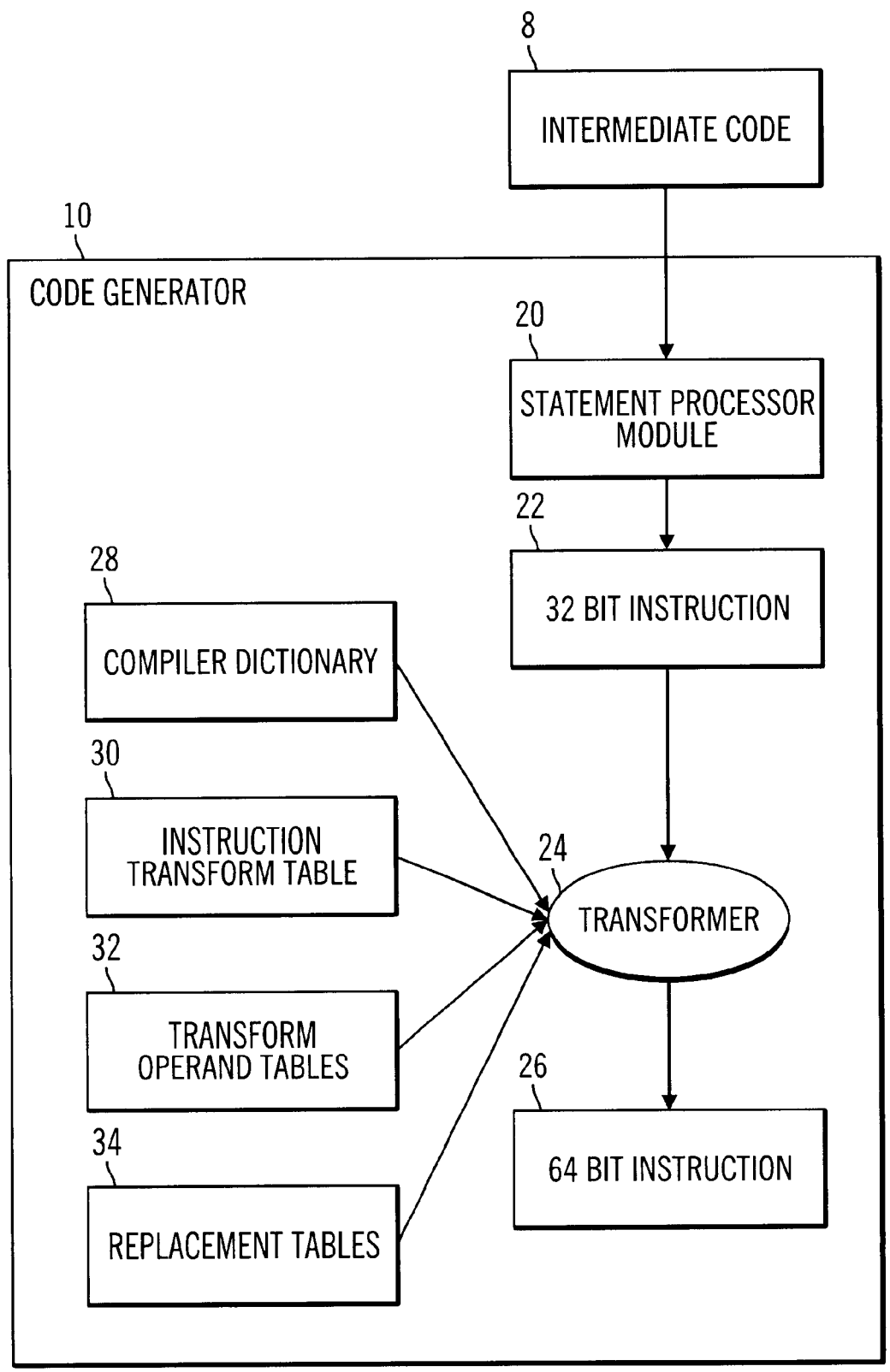
FIG. 2 illustrates the components of the code generator portion of the compiler in accordance with preferred embodiments of the present invention.

FIG. 2 illustrates the components of the code generator 10 to transform 32 bit instructions to 64 bit instructions in accordance with the preferred embodiments. A statement processor module 20 receives as input the intermediate code 8 and generates a 32 bit instruction 22. The 32 bit instruction is inputted into transformer 24, which then converts the 32 bit instruction into a 64 bit instruction 26 by using a compiler dictionary 28, instruction transform table 30, transform operand tables 32, and replacement tables 34. These tables 28, 30, 32, and 34 provide the information the transformer 24 needs in order to perform the 32 to 64 bit transformation. The compiler dictionary 28 is assembled from the 32 bit instructions and includes information on the instructions, including the properties of the operands and data fields for the instruction. For instance, a typical instruction is of the form:

op operand 1, operand 2 where "op" is the operation code indicating the type of operation, and operand 1 and operand 2 are the data subject to the operation (op). For instance, operand 1 may be the source data subject to the operation and operand 2 may be the destination including the result of the operation. Both operands 1 and 2 are addressable locations, such as registers in memory. The compiler dictionary 28 would include information on the properties of all data defined and used in the source program 4, including whether the data (operand) in a particular register is 32 or 64 bit, the size of the data field, etc.

The instruction transform table 30 includes an entry for each operation type, i.e., each op code. An index may be provided to map a particular operation code to an entry in the instruction transform table 30. In preferred embodiments, the instruction transform table 30 includes an array of pointers containing either zero or an address. If the instruction is not to be transformed, then the corresponding entry in the instruction transform table 30 will be set to zero. Otherwise, if the instruction is to be transformed, then the entry in the instruction transform table 30 will include an address to one transform operand table 32. In preferred embodiments, there is one transform operand table 32 for each entry in the instruction transform table 30 having a non-zero value, i.e., for each operation subject to transformation.

The transform operand table 32 includes an entry for the each different possible combination of operand values for the instruction type. For instance, the transform operand table 32 for a STORE instruction, which transfers data from a register to memory, may allow each operand, operands 1 and 2, to be either 32 or 64 bit. In such case, the transform operand table 32 for the STORE instruction would have four entries for each possible combination of architecture types of the operand:

1. operand 1=32 bit value operand 2=32 bit value
2. operand 1=64 bit value operand 2=64 bit value
3. operand 1=32 bit value operand 2=64 bit value
4. operand 1=64 bit value operand 2=32 bit value For each entry in one transform operand table 32, i.e., each possible combination of operand values, there is a replacement table 34 which provides information on how to implement the transformation for that particular operand architecture combination. For instance, there may be a different transformation performed for each of the four possible combinations of operand architecture types for the STORE instruction shown above. Each replacement table 34 would include fields instructing the transformer 24 on how to implement the transformation, i.e., transformation operations. In preferred embodiments, the replacement table 34 would include a field indicating the new transform op code or instruction to use in lieu of the instruction op code that is subject to the transformation and a flag indicating whether to update a register status table to indicate whether the register has 32 or 64 bit data, or to leave the register status unchanged. This register status table may be part of the compiler control structures or maintained in the compiler dictionary 28. Other flags may also be provided to indicate further transform steps to perform to complete the 32 to 64 bit transformation of the input 32 bit instruction 22.

Part of the transformation may include changing the name of the op code. For instance, 32 bit instructions may have a mnemonic format such as ST for store and L for load, and the 64 bit instructions may vary slightly, such as STG for store and LG for load. The "G" mnemonic indicates that the instruction has at least one 64 bit operand. In alternative embodiments, other mnemonics may be used to distinguish the 32 and 64 bit instructions.

Figure 3:
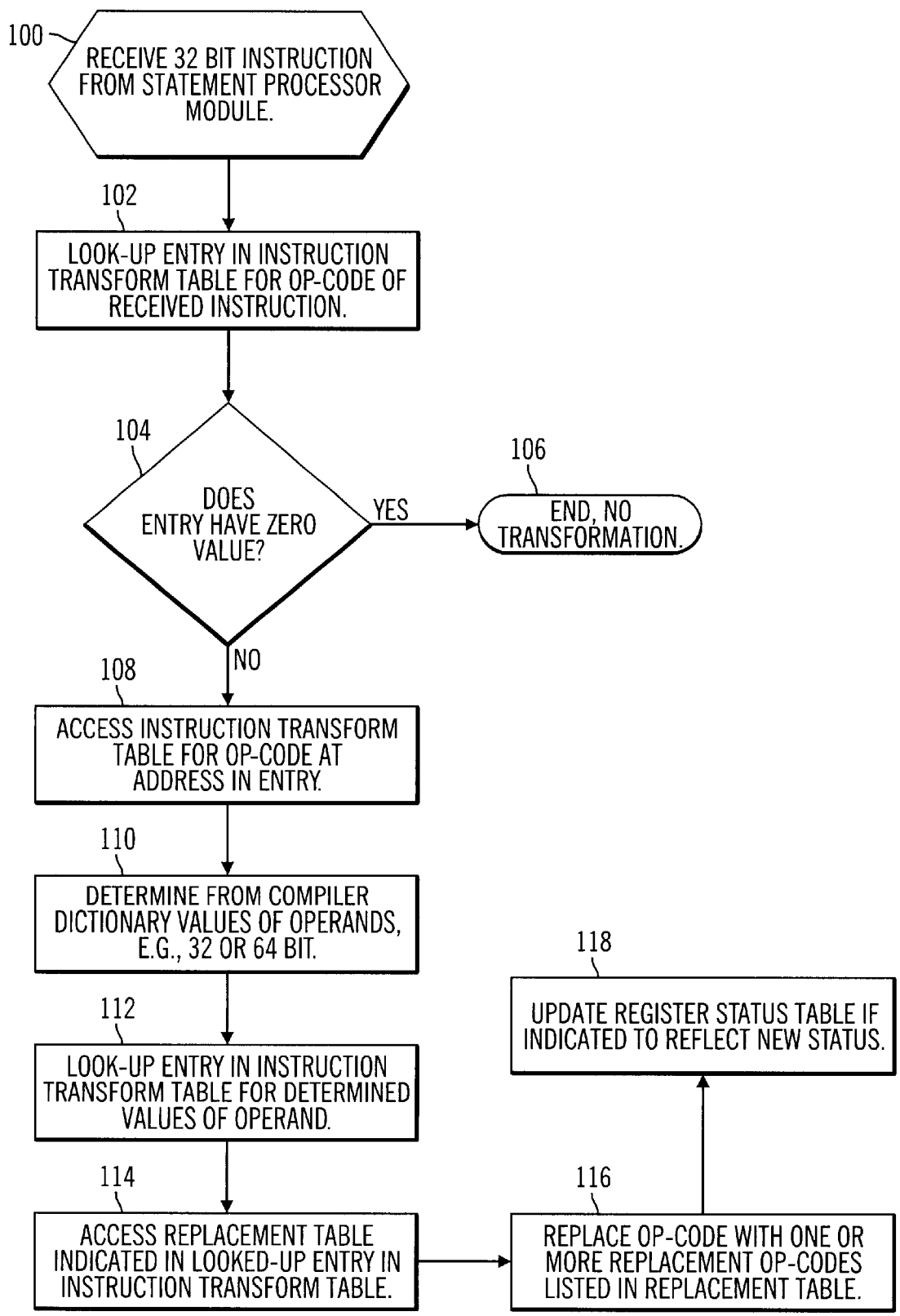
FIG. 3 illustrates logic implemented in the code generator for transforming a 32 bit instruction to a 64 bit instruction in accordance with preferred embodiments of the present invention.

FIG. 3 illustrates logic implemented in the transformer 24 component of the code generator 10 to use the tables 28, 30, 32, and 34 to transform a 32 bit instruction to a 64 bit instruction. Control begins at block 100 with the transformer 24 receiving a 32 bit instruction generated from the statement processor module 20. The transformer 24 looks-up (at block 102) the entry in the instruction transform table 30 for the op code of the received instruction. As discussed this look-up operation may involve using an index to locate the entry corresponding to the particular op code. If the value at the looked-up entry is zero (at block 104), then the transform process ends (at block 106) as a zero indicates that no transform process is to be performed for the particular op code. Otherwise, the value in the entry is a pointer to a transform operand table 32. The transformer 24 accesses (at block 108) the transform operand table 32 addressed by the pointer in the entry. The transformer 24 would also determine (at block 110) properties for the operands of the received instruction from the compiler dictionary 28, such as whether each operand is 32 or 64 bit data.

The transformer 24 would then loop (at block 112) through the entries in the transform operand table 32 to locate the entry having operand properties matching the properties of the operands of the received instruction. For instance, if the operands of the received instruction are 32 bit and 64 bit respectively, then the entry in the transform operand table 32 designated for those operand bit architecture values would be selected, which in the example of the entries for the STORE instruction above, would comprise the third entry listed above. The transformer 24 would then access (at block 114) the replacement table 34 listed in the located entry in the transform operand table 32. The transformer 24 would then replace (at block 116) the op code of the received instruction with one or more replacement op codes listed in the replacement table 34, thereby transforming the 32 bit instruction into the 64 bit instruction 26. At block 118, the transformer 24 updates the register status table to indicate a new 32 or 64 bit status as a result of the transformation as indicated in the replacement table 34. For instance, any operand in the received 32 bit instruction that is transformed would have a 64 bit value following the transformation. In such case, the register status for that previously 32 bit operand would be updated to reflect that it is now a 64 bit operand.

FIG. 4 has a table 150 that illustrates how the replacement would occur for the STORE instruction. Each entry in the table 150 would form an entry in the transform operand table 32 for the STORE instruction. Upon finding an entry having operand values for Operand 1 and 2 that match the operand values of the 32 bit instruction 22, the table 150 lists the replacement operations, including the new instruction(s) and whether the register status table is updated. Table 150 thus combines the replacement table and transform operand table entries for each combination of possible operand values. The third and fourth entries in Table 150 show that the register 1 status flag is updated as operand 1 was a 32 bit value prior to the transformation. The "G" mnemonic in the new instructions indicate that the instructions are 64 bit instructions. Further, in Table 150, a 32 bit STORE instruction having a 32 bit operand 1 is transformed into two 64 bit instructions.

Likewise, there would be a transform operand table and replacement entries or tables for every other 32 bit instruction. In preferred embodiments, for many instructions, such as ADD, SUBTRACT, MULTIPLY, DIVIDE, COMPARE, AND, OR, and EXCLUSIVE OR, whenever one of the operands is 64 bit, the replacement table 34 will include a transform operation to instruct the transformer 24 to transform the other operand to 64 bit. However, if a register is user declared as 32 bit, then the transformer 24 will not be instructed to transform such register to 64 bit. Further instructions to the transformer 24 on how to transform the 32 bit instruction to 64 bit would be encoded into the replacement tables 34.

Preferred embodiments provide a method, system, and program for transforming 32 bit instructions to 64 bit. One advantage of the preferred embodiment technique is the actual statement processor module 20 that generates the 32 bit instructions from the intermediate code does not have to be altered to accomplish the transformation. Instead, separate tables 28, 30, 32, and 34 and a transformer 24 component are added to perform the additional step of transforming the 32 bit instruction into the 64 bit instruction. In this way, the compiler code for the statement processor module 20 does not have to be modified and the initial 32 bit instruction is generated using the current compiler. The compiler developer need only add the tables and transformer 24 logic to perform the final transformation without modifying or disturbing the code generator portion that transforms intermediate code to 32 bit instructions. Preferred embodiments thus provide a technique for converting 32 bit instructions to 64 bit for target computers that only operate with 64 bit instructions or for computers, such as systems using the Intel IA-64 architecture, that can process both 32 and 64 bit instructions.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

Preferred embodiments were described with respect to transforming 32 bit to 64 bit instructions. However, the table and transformer methodology of the preferred embodiments may apply to any instruction format and bit architectures other than 32 and 64 bit, such as 8 to 16, 16 to 32, or for transformations for architectures not yet developed. This is possible because the preferred embodiment technique compiles the initial instruction into a first bit format architecture using current compilation techniques and then uses the tables and transformer to transform the instruction in the first bit architecture to a second bit format architecture. Moreover, the transformation may be performed from a larger bit architecture, e.g., 64 bit, to a smaller bit architecture, e.g., 32 bit.

Preferred embodiments described the compiler dictionary, instruction transform table, transform operand table, and replacement tables as separate tables. However, in alternative embodiments, the data within the described separate tables may be combined into one or more tables.

In summary, the present invention provides a method, system, program, and data structures for transforming an instruction from a first bit architecture to an instruction in a second bit architecture. Code is transformed from an instruction in the first bit architecture having an operation code and at least one operand. A transform table is accessed including information for transforming the instruction in the first bit architecture to the second bit architecture. The instruction in the first bit architecture is transformed to a corresponding instruction in the second bit architecture if the transform table includes information indicating to modify the instruction in the first bit architecture. The transformation is based on transformation operations that modify the instruction in the first bit architecture to generate the instruction in the second bit architecture.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transforming an instruction in a first bit architecture to an instruction in a second bit architecture that is executed in a computer system that is capable of processing instructions in both the first bit and second bit architectures, comprising:

transforming code to an instruction in the first bit architecture having an operation code and at least one operand;

accessing a transform table including information for transforming a plurality of instructions in the first bit architecture to the second bit architecture, wherein the transform table indicates for each of a plurality of operation codes either information indicating to transform an instruction including the operation code in the first bit architecture or not to transform the instruction, wherein the transform table indicates that at least one instruction is not to be transformed from the first bit architecture to the second bit architecture, wherein the instruction in the first bit architecture that is not transformed as indicated in the transform table executes successfully in the computer system; and transforming the instruction in the first bit architecture to a corresponding instruction in the second bit architecture if the transform table includes information indicating to transform the instruction in the first bit architecture, wherein the transformation is based on transformation operations that modify the instruction in the first bit architecture to generate the instruction in the second bit architecture.

2. The method of claim 1, wherein the transform table includes one entry for each operation code, wherein the entry for each operation code is capable of including a pointer to an operand table if a transformation is to be performed, wherein no transformation is performed if the entry for the operation code does not include a pointer to one operand table.

3. The method of claim 2, wherein the operand table includes an entry for each possible combination of operand bit architecture types, wherein each entry in the operand table indicates at least one transformation operation, wherein transforming the instruction comprises:

determining one entry in the operand table having operand bit architecture types that match the bit architecture types of each operand in the instruction in the first bit architecture; and executing the at least one transformation operation to transform the instruction in the first bit architecture to the second bit architecture.

4. The method of claim 3, wherein determining the bit architecture types of each operand in the instruction in the first bit architecture comprises processing a dictionary including information on the properties of each instruction in the first bit architecture.

5. The method of claim 3, wherein executing the at least one transformation operation includes changing a name of the operation code to indicate that the operation code is in the second bit architecture.

6. The method of claim 3, wherein executing the at least one transformation operation includes updating a register status table including information on each register including an operand to indicate that the register including one operand in the instruction subject to the transformation is in the second bit architecture.

7. The method of claim 6, wherein the register status table is updated to indicate that the register including one operand in the instruction subject to the transformation is in the second bit architecture when the operand in the instruction subject to the transformation is in the first bit architecture and another operand in the instruction subject to the transformation is in the second bit architecture.

8. The method of claim 3, wherein each entry in the operand table includes a pointer to a replacement table including the at least one transformation operation to transform the instruction in the first bit architecture to the second bit architecture.

9. The method of claim 1, wherein the instruction in the first bit architecture is capable of having operands in both the first bit architecture and the second bit architecture.

10. The method of claim 1, wherein the first bit architecture is a 32 bit architecture and the second bit architecture is a 64 bit architecture.

11. A system for transforming an instruction in a first bit architecture to an instruction in a second bit architecture, wherein the system is capable of processing instructions in both the first bit and second bit architectures, comprising:

means for transforming code to an instruction in the first bit architecture having an operation code and at least one operand;

means for accessing a transform table including information for transforming a plurality of instructions in the first bit architecture to the second bit architecture, wherein the transform table indicates for each of a plurality of operation codes either information indicating to transform an instruction including the operation code in the first bit architecture or not to transform the instruction wherein the transform table indicates that at least one instruction is not to be transformed from the first bit architecture to the second bit architecture, wherein the instruction in the first bit architecture that is not transformed as indicated in the transform table executes successfully in the computer system; and means for transforming the instruction in the first bit architecture to a corresponding instruction in the second bit architecture if the transform table includes information indicating to transform the instruction in the first bit architecture, wherein the transformation is based on transformation operations that modify the instruction in the first bit architecture to generate the instruction in the second bit architecture.

12. The system of claim 11, wherein the transform table includes one entry for each operation code, wherein the entry for each operation code is capable of including a pointer to an operand table if a transformation is to be performed, wherein no transformation is performed if the entry for the operation code does not include a pointer to one operand table.

13. The system of claim 12, wherein the operand table includes an entry for each possible combination of operand bit architecture types, wherein each entry in the operand table indicates at least one transformation operation, wherein the means for transforming the instruction comprises:

means for determining one entry in the operand table having operand bit architecture types that match the bit architecture types of each operand in the instruction in the first bit architecture; and means for executing the at least one transformation operation to transform the instruction in the first bit architecture to the second bit architecture.

14. The system of claim 13, wherein the means for determining the bit architecture types of each operand in the instruction in the first bit architecture comprises processing a dictionary including information on the properties of each instruction in the first bit architecture.

15. The system of claim 13, wherein the means for executing the at least one transformation operation includes changing a name of the operation code to indicate that the operation code is in the second bit architecture.

16. The system of claim 13, wherein the means for executing the at least one transformation operation includes updating a register status table including information on each register including an operand to indicate that the register including one operand in the instruction subject to the transformation is in the second bit architecture.

17. The system of claim 16, wherein the register status table is updated to indicate that the register including one operand in the instruction subject to the transformation is in the second bit architecture when the operand in the instruction subject to the transformation is in the first bit architecture and another operand in the instruction subject to the transformation is in the second bit architecture.

18. The system of claim 13, wherein each entry in the operand table includes a pointer to a replacement table including the at least one transformation operation to transform the instruction in the first bit architecture to the second bit architecture.

19. The system of claim 13, wherein the instruction in the first bit architecture is capable of having operands in both the first bit architecture and the second bit architecture.

20. The system of claim 13, wherein the first bit architecture is a 32 bit architecture and the second bit architecture is a 64 bit architecture.

21. An article of manufacture for use in transforming an instruction in a first bit architecture to an instruction in a second bit architecture that is executed in a computer system that is capable of processing instructions in both the first bit and second bit architectures, the article of manufacture comprising a computer usable media including at least one computer program embedded therein that is capable of causing the computer to perform:
    transforming code to an instruction in the first bit architecture having an operation code and at least one operand;
    accessing a transform table including information for transforming a plurality of instructions in the first bit architecture to the second bit architecture, wherein the transform table indicates for each of a plurality of operation codes information indicating to transform an instruction including the operation code in the first bit architecture or not to transform the instruction, wherein the transform table indicates that at least one instruction is not to be transformed from the first bit architecture to the second bit architecture, wherein the instruction in the first bit architecture that is not transformed as indicated in the transform table executes successfully in the computer system; and
    transforming the instruction in the first bit architecture to a corresponding instruction in the second bit architecture if the transform table includes information indicating to transform the instruction in the first bit architecture, wherein the transformation is based on transformation operations that modify the instruction in the first bit architecture to generate the instruction in the second bit architecture.

22. The article of manufacture of claim 21, wherein the transform table includes one entry for each operation code, wherein the entry for each operation code is capable of including a pointer to an operand table if a transformation is to be performed, wherein no transformation is performed if the entry for the operation code does not include a pointer to one operand table.

23. The article of manufacture of claim 22, wherein the operand table includes an entry for each possible combination of operand bit architecture types, wherein each entry in the operand table indicates at least one transformation operation, wherein transforming the instruction comprises:
    determining one entry in the operand table having operand bit architecture types that match the bit architecture types of each operand in the instruction in the first bit architecture; and
    executing the at least one transformation operation to transform the instruction in the first bit architecture to the second bit architecture.

24. The article of manufacture of claim 23, wherein determining the bit architecture types of each operand in the instruction in the first bit architecture comprises processing a dictionary including information on the properties of each instruction in the first bit architecture.

25. The article of manufacture of claim 23, wherein executing the at least one transformation operation includes changing a name of the operation code to indicate that the operation code is in the second bit architecture.

26. The article of manufacture of claim 23, wherein executing the at least one transformation operation includes updating a register status table including information on each register including an operand to indicate that the register including one operand in the instruction subject to the transformation is in the second bit architecture.

27. The article of manufacture of claim 26, wherein the register status table is updated to indicate that the register including one operand in the instruction subject to the transformation is in the second bit architecture when the operand in the instruction subject to the transformation is in the first bit architecture and another operand in the instruction subject to the transformation is in the second bit architecture.

28. The article of manufacture of claim 23, wherein each entry in the operand table includes a pointer to a replacement table including the at least one transformation operation to transform the instruction in the first bit architecture to the second bit architecture.

29. The article of manufacture of claim 21, wherein the instruction in the first bit architecture is capable of having operands in both the first bit architecture and the second bit architecture.

30. The article of manufacture of claim 21, wherein the first bit architecture is a 32 bit architecture and the second bit architecture is a 64 bit architecture.

31. A computer readable data transmission medium containing at least one data structure for use in transforming an instruction in a first bit architecture to an instruction in a second bit architecture that is executed in a computer system that is capable of processing instructions in both the first bit and second bit architectures, comprising:
    at least one transform table including information for transforming an instruction in the first bit architecture to the second bit architecture, wherein the transform table indicates for each of a plurality of operation codes information indicating to transform an instruction including the operation code in the first bit architecture or not to transform the instruction, wherein the transform table indicates that at least one instruction is not to be transformed from the first bit architecture to the second bit architecture, wherein the instruction in the first bit architecture is transformed to a corresponding instruction in the second bit architecture if the transform table includes information indicating to modify the instruction in the first bit architecture, and wherein the instruction in the first bit architecture that is not transformed as indicated in the transform table executes successfully in the computer system; and transformation operations indicating operations to perform to modify the instruction in the first bit architecture to generate the instruction in the second bit architecture.

32. The computer readable data transmission medium of claim 31, further comprising:

at least one operand table, wherein the transform table includes one entry for each operation code, wherein the entry for each operation code is capable of including a pointer to one operand table if a transformation is to be performed, wherein no transformation is performed if the entry for the operation code does not include a pointer to one operand table.

33. The computer readable data transmission medium of claim 32, wherein the operand table includes an entry for each possible combination of operand bit architecture types, wherein each entry in the operand table indicates at least one transformation operation, wherein the operand table includes one entry having operand bit architecture types that match the bit architecture types of each operand in the instruction in the first bit architecture, wherein the at least one transformation operation is executed to transform the instruction in the first bit architecture to the second bit architecture.

34. The computer readable data transmission medium of claim 33, further comprising a dictionary including information on the properties of each instruction in the first bit architecture, wherein determining the bit architecture types of each operand in the instruction in the first bit architecture comprises processing the dictionary to determine the properties of each instruction.

35. The computer readable data transmission medium of claim 33, further comprising a register status table including information on each register including an operand to indicate that the register including one operand in the instruction subject to the transformation is in the second bit architecture, wherein the register status table is updated when executing the at least one transformation operation.

36. The computer readable data transmission medium of claim 33, wherein each entry in the operand table includes a pointer to a replacement table including the at least one transformation operation to transform the instruction in the first bit architecture to the second bit architecture.

* * * * *